(12) United States Patent
Perrodin et al.

(10) Patent No.: US 8,751,933 B2
(45) Date of Patent: Jun. 10, 2014

(54) VIDEO AND AUDIO WAVEFORM USER INTERFACE

(75) Inventors: Laurent Perrodin, Menlo Park, CA (US); Randy Ubillos, Los Altos, CA (US); Richard Townhill, Foster City, CA (US); Judson Coplan, San Francisco, CA (US); Mike Mitchell, San Jose, CA (US); Jer Granucci, Woodside, CA (US); Keith Salvucci, Belmont, CA (US)

(73) Assignee: Apple Inc., Cupertino, CA (US)

( * ) Notice: Subject to any disclaimer, the term of this patent is extended or adjusted under 35 U.S.C. 154(b) by 737 days.

(21) Appl. No.: 12/872,778

(22) Filed: Aug. 31, 2010

(65) Prior Publication Data

US 2012/0054611 A1     Mar. 1, 2012

(51) Int. Cl.
*G06F 3/01* (2006.01)
(52) U.S. Cl.
USPC ............................ 715/723; 715/716; 715/719
(58) Field of Classification Search
CPC ....................................................... G06F 3/01
USPC ......................................... 715/716, 719, 723
See application file for complete search history.

(56) References Cited

U.S. PATENT DOCUMENTS

| 5,467,288 A | 11/1995 | Fasciano et al. |
| 6,714,216 B2 | 3/2004 | Abe |
| 7,260,306 B2 | 8/2007 | Murata et al. |
| 2009/0183078 A1 | 7/2009 | Clement et al. |
| 2012/0014673 A1* | 1/2012 | O'Dwyer ...................... 386/282 |

FOREIGN PATENT DOCUMENTS

WO    WO 2010/034063    4/2010

* cited by examiner

*Primary Examiner* — Andrea Leggett
(74) *Attorney, Agent, or Firm* — Schwegman Lundberg & Woessner, P.A.

(57) ABSTRACT

Among other things, methods, systems and computer program products are disclosed for presenting a user interface for manipulation of audio waveforms associated with video content. In one aspect, a method can be performed by one or more processes executing on a computer system. Images representing video frames in a first region of a user interface can be displayed. An audio waveform representing audio associated with at least a portion of a video frame can be displayed. At least three audio waveform portions including (i) a first portion of the audio waveform that exceeds a first predetermined threshold, (ii) a second portion of the audio waveform below the first predetermined threshold and above a second predetermined threshold, and (iii) a third portion of the audio waveform below the second predetermined threshold can be graphically distinguished.

36 Claims, 10 Drawing Sheets

US 8,751,933 B2

VIDEO AND AUDIO WAVEFORM USER INTERFACE

TECHNICAL FIELD

This specification relates to digital content management systems.

BACKGROUND

Digital recording equipment enables users to capture and store digital media content items, for example, video, images, audio, and the like. Software applications enable users to perform operations on the captured and stored digital media content. Such operations include viewing, editing, and the like. For video segments, a software application's editing operations can include deleting portions of the video segment, combining two or more video segments, overlaying content on a stored video segment, and the like. Some software applications allow users to associate audio with video content. After such associating, as the video content is played, the associated audio content is also played, e.g., as background music to the video content. In some scenarios, multiple audio tracks can be associated with video content. For example, a first audio track can include audio that was captured along with the video content and a second audio track can include background music that is associated with the video content after the video content is captured.

SUMMARY

This specification describes technologies relating to depicting and editing audio waveforms in association with video content.

In one aspect, a method is performed by one or more processes executing on a computer system. Images representing video frames in a first region of a user interface are displayed. An audio waveform representing audio associated with at least a portion of a video frame is displayed. At least three audio waveform portions including (i) a first portion of the audio waveform that exceeds a first predetermined threshold, (ii) a second portion of the audio waveform below the first predetermined threshold and above a second predetermined threshold, and (iii) a third portion of the audio waveform below the second predetermined threshold are graphically distinguished.

Implementations can optionally include one or more of the following features. An audio volume range defined by the first and second predetermined thresholds can be a preferred audio volume range. The first predetermined threshold can be substantially 0 decibels and the second predetermined threshold is substantially −6 decibels. Graphically distinguishing can include representing the first portion of the audio waveform in a first color, the second portion of the audio waveform in a second, different, color, and the third portion of the audio waveform in a third, different, color. A user input indicating a change in volume level for at least a portion of the audio waveform can be received. An appearance of the audio waveform can be changed in response to the received user input. Changing the appearance of the audio waveform can include positioning a segment of the audio waveform between the first predetermined threshold and the second predetermined threshold and applying the second color to the segment, wherein the segment had not previously been positioned between the first and second predetermined thresholds.

In another aspect, Images representing video frames in a first region of a user interface are displayed. An audio waveform representing audio associated with at least a portion of the video frames is displayed. The audio waveform is associated with a first volume setting. Input selecting a portion of the audio waveform is received. The input indicates left and right bounds for the selected portion, and the selected portion is less than all of the audio waveform. Left and right fade points corresponding to the selected portion are automatically determined. The left and right bounds of the selected portion, and the determined left and right fade points are displayed in conjunction with the audio waveform. A volume change to a second volume setting for the selected portion of the audio waveform is received. A portion of the audio waveform located between the left fade point and the left bound is faded from the first volume setting to the second volume setting in response to the volume setting change. A portion of the audio waveform located between the right bound and the right fade point is faded from the second volume setting to the first volume setting in response to the volume setting change.

Implementations can optionally include one or more of the following features. The duration between a fade point and the corresponding bound can be a predetermined percentage of the duration between the left bound and the right bound. The predetermined percentage can be 10 percent. Input indicating a change in position of the right bound can be received. The position of the right bound, the left fade point, and the right fade point can be changed in response to the received input, so that the duration between the left fade point and the left bound is the predetermined percentage of the duration between the left bound and the new position for the right bound and the duration between the right fade point and the right bound is the predetermined percentage of the duration between the left bound and the new position for the right bound. Input indicating a change in position of the right bound can be received. The position of the right bound and the right fade point can be changed in response to the received input. The left fade point can be a set duration from the left bound and the right fade point can be a set duration from the right bound. Fading can include applying a linear fade. Fading can include applying a user selected fade. A visual representation of the fading can be displayed for at least one of the portion of the audio waveform located between the left fade point and the left bound, and the portion of the audio waveform located between the right bound and the right fade point. The received input can be entered using a single cursor motion.

In another aspect, a video sequence comprising images is accessed. A visual representation of the video sequence comprising one or more still images extracted from the video sequence is displayed. Each still image is associated with a segment of the video sequence. A first audio waveform representing a first audio signal is presented in conjunction with at least a portion of the video sequence. Input indicating an audio effect to be associated with a segment of the video sequence is received. The indicated audio effect is applied to a first portion of the first audio waveform corresponding to the segment. A position of the first video sequence segment within the video sequence is changed in response to a second user input. The position of the first portion of the first audio waveform associated with the first video sequence is not changed. The indicated audio effect is applied to a second portion of the first audio waveform that is associated with the first video sequence segment after the position of the first video sequence segment has been changed. The first portion of the first audio waveform is different from the second portion of the first audio waveform.

Implementations can optionally include one or more of the following features. The indicated audio effect can be removed from the first portion of the first audio waveform responsive to the changing of position of the first video sequence segment. A second audio waveform representing a second audio signal associated with the video sequence can be presented. A first portion of the second audio waveform can be associated with the first video sequence segment. A position of the first portion of the second audio waveform can be changed responsive to the changing of position of the first video sequence segment such that the first portion of the second audio waveform is aligned with the first video sequence segment after the position of the first video sequence segment has been changed. The indicated audio effect can be applied to the first portion of the second audio waveform. The indicated audio effect can be a ducking effect and a visual representation of the ducking effect can applied to the second portion of the first audio waveform.

The subject matter described in this specification can potentially provide one or more of the following advantages. Ideal audio volume levels can be readily and efficiently visualized to allow users to adjust audio volume levels associated with video segments such that the audio volume levels are within an ideal range. Audio waveform segments can be readily selected with a minimum amount of user input. Fade points for a selected audio waveform segment can be automatically identified. The spacing and positions of audio waveform segment fade points can be automatically adjusted in response to user indicated changes to a selected audio waveform segment. Audio effects can be associated with video segments and applied to audio portions that are synchronized with the video segments. Audio effects associated with video segments can be readily applied to different portions of an audio waveform as the position of the video segment within a series of video segments is changed.

The subject matter described in this specification can be implemented as a method or as a system or using computer program products, tangibly embodied in computer readable medium, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

The details of one or more implementations of the specification are set forth in the accompanying drawings and the description below. Other features, aspects, and potential advantages of the specification will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
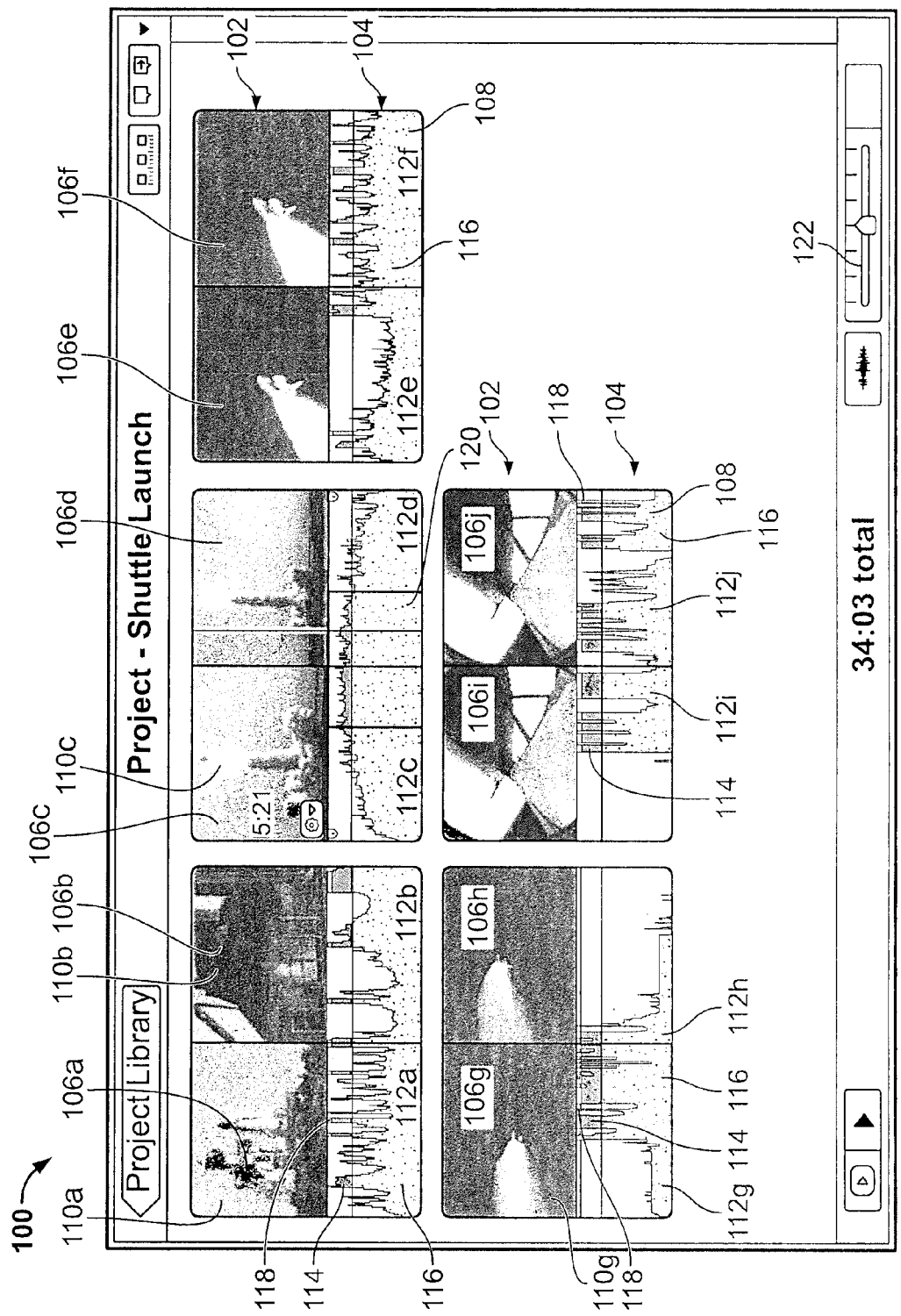
FIG. 1A is an example of a user interface for indicating audio volume levels with respect to an ideal audio volume range.

FIG. 1A shows an example user interface 100. The user interface 100 can be displayed on the display screen of a display device, e.g. an LCD monitor. In some implementations, the user interface 100 is provided by an audio-video content management software application that includes instructions that are installed on a computer-readable medium which when executed by a computer that is operatively coupled to the display device cause the computer to perform operations.

The user interface 100 includes visual representations of a video sequence 102 and an associated audio sequence 104. In some implementations, the video sequence 102 is displayed in response to a user uploading digital video content, e.g., an MPEG video file, a MOV video file, or the like. The video sequence 102 is visually represented as a number of images 106a-j derived from the video sequence 102. In some implementations, each of the images 106a-j represents a video segment where each of the images 106a-j is derived from the video segment that the image represents.

The audio sequence 104 is represented as an audio waveform 108. In the example shown, the x-axis of the audio waveform 108 represents time and the y-axis represents an audio volume level (i.e., volume amplitude) of the audio sequence 104. Vertical fluctuations of the audio waveform 108 over time indicate volume level fluctuations of the audio sequence 104. In some implementations, the audio sequence 104 is audio that was captured at the time that the video sequence 102 was captured. For example, the video sequence 102 can be a home movie of youth baseball game and the audio sequence 104 can be an audio recording of the youth baseball game that was captured concurrently with the video sequence 102. In some implementations, the audio sequence 104 is associated with the video sequence 102 in that both the audio sequence 104 and the video sequence 102 are saved in the same video file.

In some implementations, the audio sequence 104 is associated with the video sequence 102 after the video sequence 102 is captured. For example, the audio sequence 104 can be a song stored as an audio file (e.g., mp3) that is associated with the video sequence 102 after the video sequence 102 has been captured. Portions of the audio waveform 108 can be associated with various segments of the video sequence 102. For example, the image 106b represents a video segment 110b and an audio waveform segment 112b can be associated with the video segment 110b. In the example shown, the audio waveform segment 112b occupies the same time space as the video segment 110b such that the audio waveform segment 112b and the video segment 110b are played together when the video sequence 102 and audio sequence 104 are played.

In some implementations, the video sequence 102 can be edited by changing the position of one or more segments of the video sequence 102. For example, the image 106a represents a video segment 110a and the image 106c represents a video segment 110c. A user of the user interface 100 can select the image 106a and position the image 106a to the right of the image 106c (e.g., using a cursor to perform a "drag and drop" action). This can cause the video segment 110a to be moved from the beginning of the video sequence 102 to after the video segment 110c. This causes the video segment 110a to be played after the video segment 110c when the video sequence 102 is played.

In some implementations, an audio waveform segment 112a can be associated with the video segment 110a. In some implementations, when the position of the video segment 110a is changed, the position of the audio waveform segment 112a is also changed so that the audio waveform segment 112a will be played at the same time as the video segment 110a when the video sequence 102 is played back. In some implementations, the audio waveform segment 112a is not automatically repositioned in conjunction with the repositioning of the video segment 110a. For example, the video segment 110a can be repositioned after the video segment 110c, while the order of the segments that make up the audio waveform 108 is not changed.

In some implementations, the audio waveform 108 can include one or more indications of an ideal volume level. In some implementations, the ideal volume level can be a volume range. In some implementations, the visual appearance of the audio waveform 108 can be altered to indicate portions of the audio waveform 108 that are located within the ideal volume range. For example, a visual indicator 114 (e.g., a fill pattern, color, shade, or other marking) can be used to identify portions of the audio waveform 108 that fall within the ideal volume range. In some implementations, the ideal volume range can be between about −16 and +6 decibels, between about −12 and +4 decibels, between about −10 and +3 decibels, between about −8 and +4 decibels, between about −7 and +1 decibels, or between about −6 and 0 decibels.

In some implementations, the ideal volume range can be a range that allows for audio of the audio sequence 104 to be readily heard by the average user while being below a volume level that could cause clipping of the audio signal. Audio clipping can occur when a speaker or other audio device is pushed to create a signal that requires more power than can be supplied by the power supply of the speaker or audio device. In some implementations, adjusting the audio waveform 108 so that the audio waveform 108 is below the upper bound of the ideal volume range can prevent clipping of the audio sequence 104.

In some implementations, portions of the audio waveform 108 that are positioned outside of the ideal volume range can be indicated as being above or below the ideal volume range. In some implementations, the visual appearance of the audio waveform 108 can be altered to indicate portions of the audio waveform 108 that are located above or below the ideal volume range. For example, a visual indicator 116 (e.g., a fill pattern, color, shade, or other marking) can be used to identify portions of the audio waveform 108 that are positioned below the lower bound of the ideal volume range and a visual indicator 118 can be used to identify portions of the audio waveform that are positioned above the upper bound of the ideal volume range.

The user interface 100 can allow a user to adjust volume levels of the audio waveform 108 to bring portions of the audio waveform 108 into the ideal audio range. For example, a user can use a cursor to select an audio waveform portion 120. In some implementations, the user can position the cursor over a portion of the audio waveform 108 using a mouse, press a mouse button, move the mouse left or right, and depress the mouse button to select the audio waveform portion 120 in a single cursor motion. The user can then adjust a volume control 122 to adjust the amplitude of the audio waveform 108. In some implementations, the user can lower the volume level of a segment of the audio waveform 108 that is above the ideal volume range so that the volume level of the segment is within the ideal volume range. In some implementations, the user can raise the volume level of a segment of the audio waveform 108 that is below the ideal volume range so that the segment is within the ideal volume range.

In some implementations, when a user adjusts the volume level of a segment of the audio waveform 108, the visual appearance of portions of the audio waveform 108 are changed to indicate that the portions are within the ideal volume range, above the ideal volume range, or below the ideal volume range. For example, portions of an audio waveform segment can be indicated as above the ideal volume range by the visual indicator 118. The user can lower the volume level of the segment so that the portions are within the ideal volume range. The visual appearance of the portions can be changed from the visual indicator 118 to the visual indicator 114 to indicate that the portions are now within the ideal volume range. The user interface 100 can additionally display the portions of the audio waveform 108 as being located within the ideal volume range in response to the user input. The user interface 100 can indicate the ideal volume range and non-ideal audio ranges using different fill patterns or different colors to allow users to readily identify portions of the audio waveform 108 that are within ideal and non-ideal volume ranges and to allow users to easily adjust the audio waveform 108 so that portions of the audio waveform 108 are located within the ideal volume range. For example, portions of the audio waveform 108 that are within the ideal volume range can be colored yellow, portions of the audio waveform 108 that are above the ideal volume range can be colored red, and portions of the audio waveform 108 that are below the ideal volume range can be colored blue.

Figure 1B:
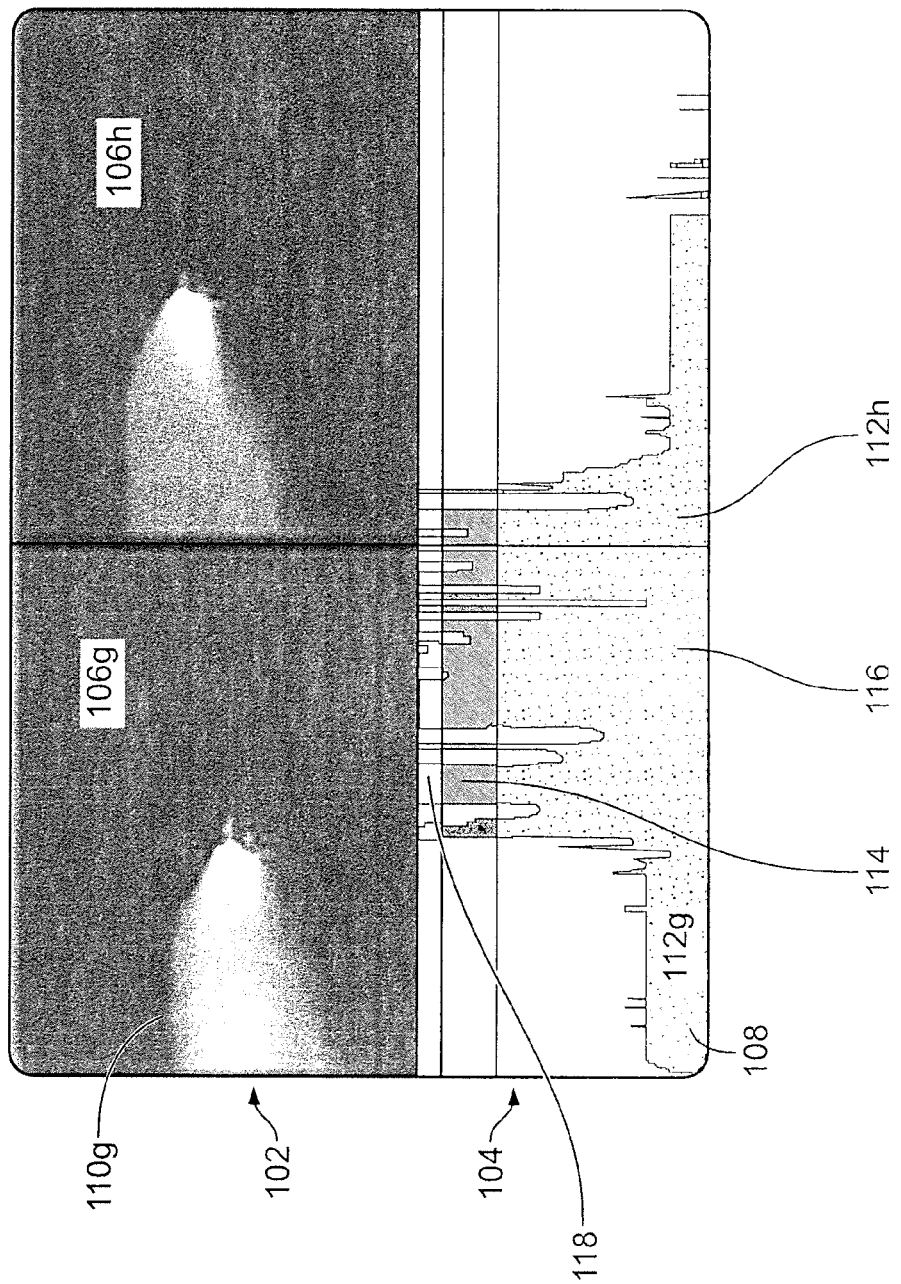
FIG. 1B is an expanded view of portions of a video sequence and an audio waveform of FIG. 1A.

FIG. 1B shows an expanded view of portions of the video sequence 102 and the audio waveform of 108 of FIG. 1A. In this expanded view, an audio waveform segment 112g is associated with a video segment 110g. The expanded more clearly shows portions of the audio waveform segment 112g that are within an ideal volume range, portions of the audio waveform segment 112g that exceed the ideal volume range, and portions of the audio waveform segment 112g that are below the ideal volume range. The visual indicator 114 is used to indicate portions of the audio waveform segment 112g that are within the ideal volume range. In the example shown, the visual indicator 114 takes the form of a distinct fill pattern. In some implementations, the visual indicator 114 can take other forms, such as a color.

The visual indicator 118 is used to indicate portions of the audio waveform segment 112g that exceed the ideal volume range. In some implementations, the visual indicator 118 can indicate portions of the audio waveform segment 112g that are likely to be affected by clipping upon playback of the audio waveform segment 112g. Audio clipping can occur when a speaker or other audio device is pushed to create a signal that requires more power than can be supplied by the power supply of the speaker or audio device. In the example shown, the visual indicator 118 takes the form of a distinct fill pattern. In some implementations, the visual indicator 118 can take other forms, such as a color. For example, the portions of the audio waveform segment 112g that are indicated by the visual indicator 118 can be marked red to warn a user that potential clipping can occur for portions of the audio waveform segment 112g indicated by the visual indicator 118.

The visual indicator 116 is used to indicate portions of the audio waveform segment 112g that are below the ideal volume range. In some implementations, portions of the audio waveform segment 112g that are below the ideal volume range can be difficult for users to readily discern. The visual indicator 116 can indicate to a user portions of the audio waveform segment 112g where the audio level may need to be adjusted in order to bring the portions of the audio waveform segment 112g into the ideal volume range. In the example shown, the visual indicator 116 takes the form of a distinct fill pattern. In some implementations, the visual indicator 116 can take other forms, such as a color. For example, the visual indicator 114 can be green, the visual indicator 118 can be red, and the visual indicator 116 can be grey.

Figure 2:
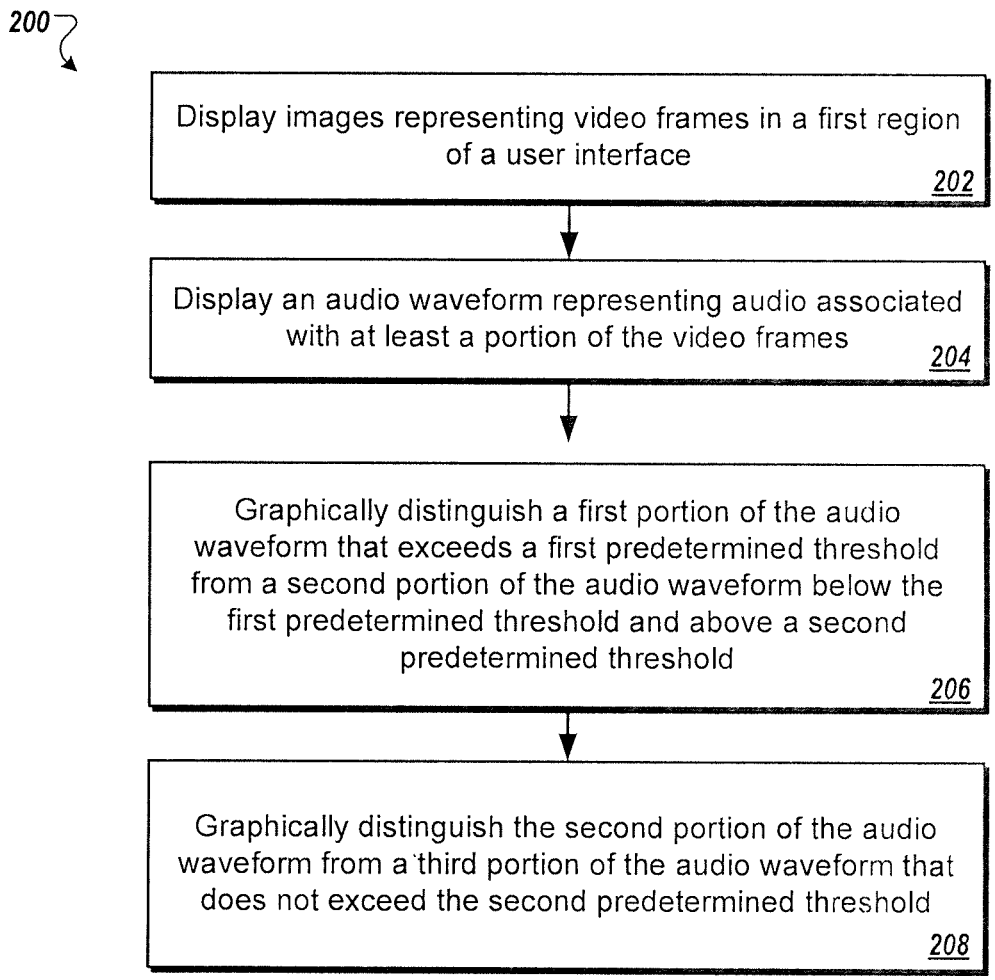
FIG. 2 is a flow diagram of an example process for visually depicting portions of an audio waveform within various audio volume ranges.

FIG. 2 is a process flow diagram showing an example process 200 for visually depicting portions of an audio waveform within various audio volume ranges. Images representing video frames are displayed in a first region of a user interface (202). For example, a computer system connected to a display screen can cause the display screen to display a user interface (e.g., the user interface 100 of FIG. 1A). The user interface can, for example, facilitate the editing of video sequences and audio sequences associated with the video sequences. Images (e.g., images 106a-j of FIG. 1A) that represent a video sequence can be displayed in the user interface. In some implementations, the images can be still images taken from the video sequence. In some implementations, each image represents a segment of the video sequence. In some implementations, each image represents a number of video frames of the video sequence. In some implementations, each image is taken from one of the video frames represented by the image.

An audio waveform representing audio associated with at least a portion of the video frames is displayed (204). For example, a waveform can be displayed that shows changes in volume level (amplitude) over time for the audio. In some implementations, segments of the waveform can be aligned with the images that represent video frames to indicate portions of audio that are played along with video segments represented by the images. In some implementations, the audio can be audio that is captured at the same time as the video. In some implementations, the audio can be added to the video after the video is captured. For example, the audio waveform can represent a song or a series of sound effects that are associated with the video after the video is captured.

A first portion of the audio waveform that exceeds a first predetermined threshold is graphically distinguished from a second portion of the audio waveform below the first predetermined threshold and above a second predetermined threshold (206). For example, a portion of the audio waveform that exceeds a maximum volume level can be colored red while a portion of the audio waveform that is below the maximum volume level can be colored green. In some implementations, the first predetermined threshold can indicate a volume level at which the audio signal associated with the audio waveform begins to clip. In some implementations, the first predetermined threshold can be between about +/−2 decibels, between about +/−1 decibels, or about 0 decibels.

The second portion of the audio waveform is graphically distinguished from a third portion of the audio waveform that does not exceed the second predetermined threshold (208). For example, the second portion that is positioned between the first and second predetermined thresholds can be colored green and the third portion of the audio waveform that is positioned below the second predetermined threshold can be colored grey. In some implementations, the second predetermined threshold can indicate a volume level below which the audio signal associated with the audio waveform can not be clearly heard by most users. In some implementations, the second predetermined threshold can be a minimum volume level for which audio can be easily heard and understood. In some implementations, the first predetermined threshold can be between about −8 and −4 decibels, between about −7 and −5 decibels, or about −6 decibels.

In some implementations, the process 200 can include more or less steps, or the steps can be performed in a different order. For example, the step of graphically distinguishing the second portion from the third portion can be performed before the step of graphically distinguishing the first portion from the second portion.

Figure 3A:
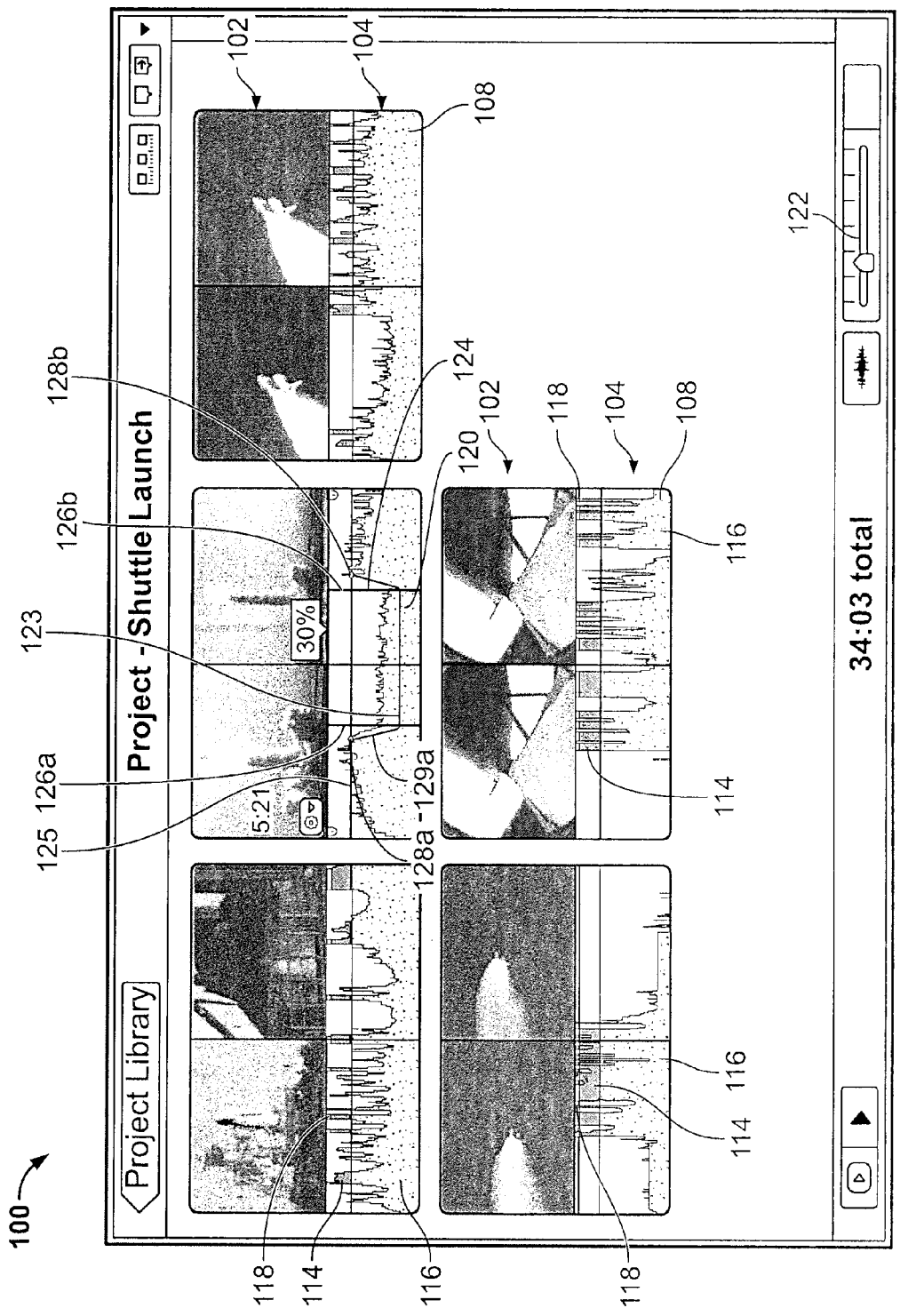
FIGS. 3A and 3B are examples of a user interface for automatically identifying and displaying audio fade points for an audio waveform segment.

FIG. 3A shows the user interface 100 of FIG. 1A. In FIG. 3A, the audio waveform portion 120 has been selected by a user. For example, a user can drag a cursor across the audio waveform 108, using a single cursor motion, in order to select the audio waveform portion 120. In some implementations, the audio waveform portion 120 can be indicated as being a selected portion of the audio waveform 108 by being highlighted, or by being surrounded by a selection box 124. The selection box 124 can indicate a left bound 126a and a right bound 126b for the audio waveform portion 120. In some implementations, changes to the audio waveform (e.g., volume level changes, audio effects, etc.) indicated by the user are only applied to the audio waveform portion 120 since the audio waveform portion 120 represents the selected portion of the audio waveform 108.

The user can adjust a volume level of the selected audio waveform portion 120 (e.g., using the volume control 122). In the example shown, the user uses the volume control 122 to adjust the volume level of the selected audio waveform portion 120 from an initial volume level to a second volume level that 30% below the initial volume level. As another example, the user can select a horizontal bar 123. The user can adjust the vertical position of the horizontal bar within the selection box 124 to change the volume level for the selected audio waveform portion 120 from the initial volume setting to a second volume setting. In some implementations, the initial volume setting can be a volume level at which the audio sequence 104 was recorded, or a normalized volume level for the audio sequence 104. In some implementations, the initial volume setting can be indicated by a horizontal volume bar 125.

In some implementations, changing the volume level of the selected audio waveform portion 120 can cause visual indicators associated with the selected audio waveform portion 120 to be changed. For example, portions of the selected audio waveform portion 120 can be within the ideal volume range prior to the change in volume level. These portions can be colored or indicated by the visual indicator 114 to indicate that the portions are within the ideal volume range. Following the volume change, no portions of the selected audio waveform portion 120 are within the ideal volume range; therefore all of the selected audio waveform portion 120 is indicated by the visual indicator 116 to indicate that all of the selected audio waveform portion 120 is below the ideal volume range.

In some implementations, an audio-video content management software application (or other application) associated with the user interface 100 can automatically identify fade points in association with the selected audio waveform portion 120. A left fade point 128a can be identified in association with the left fade point 128a and a right fade point 128b can be identified in association with the right fade point 128*b*. The left fade point 128*a* can indicate a point in the audio waveform 108 at which a fade effect is to begin. The fade effect can be a transition from the initial volume level of the audio waveform 108 to the second volume level. The fade effect can begin at the left fade point 128*a* and end at the left bound 126*a*, with portions of the audio waveform to the left of the left fade point 128*a* remaining at the initial volume level and the selected audio waveform portion 120 located between the left and right bounds 126*a*-*b* having the second volume level.

The fade effect can take one of a number of forms. For example, the fade can be a linear fade effect. As another example, the fade can be a curved fade effect. In some implementations, the curve of a curved fade effect can follow the trajectory of a specified function. In some implementations, the fade effect can be a user defined fade effect. In some implementations, the user can select a default fade effect to be automatically be applied to all faded portions of the audio waveform 108. In some implementations, the portion of the audio waveform 108 between the left fade point 128*a* and the left bound 126*a* (i.e., the left fade portion) can include a visual representation of the applied fade. For example, the amplitude of the waveform within the left fade portion can be adjusted to reflect the applied fade effect. In some implementations, a volume bar can be adjust to visually indicate the applied fade. For example, a fade bar 129*a* indicates a transition from the initial volume setting (indicated by the horizontal volume bar 125) and the second volume setting (indicated by the horizontal bar 123)

In some implementations, a fade effect can be applied to the portion of the audio waveform 108 located between the right bound 126*b* and the right fade point 128*b* (i.e., the right fade portion). The fade effect can be a transition from the second volume level to the initial volume level, with portions of the audio waveform 108 located to the right of the right fade point 128*b* having the initial volume level and the selected audio waveform portion 120 having the second volume level.

The fade applied to the right fade portion can take one of multiple forms as described above for the fade effect applied to the portion of the audio waveform 108 located between the left fade point 128*a* and the left bound 126*a*. In some implementations, complimentary fade effects (e.g., mirror image fade effects) are applied to the two fade portions. In some implementations, a first fade effect is applied to the left fade portion while a second different fade effect is applied to the right fade portion. In some implementations, the amplitude waveform located in the right fade portion is adjusted to visually indicate the applied fade effect. In some implementations, a volume bar can be adjust to visually indicate the applied fade.

The positions of the left and right fade points 128*a*-*b* can be automatically determined without the user indicating positions for the left and right fade points 128*a*-*b*. In some implementations, the positions of the left and right fade points 128*a*-*b* are determined with respect to the positions of the left and right bounds 126*a*-*b*. In some implementations, the left and right fade points 128*a*-*b* can be a set duration from the left and right bounds 126*a*-*b*. For example, the left fade point 128*a* can be positioned within the audio waveform 108 so as to be located 0.5 seconds before the left bound 126*a*. In some implementations, the user can specify the amount of time that is to elapse between the left bound 126*a* and the left fade point 128*a*. In some implementations, the user can specify different time durations for the left fade portion and the right fade portion.

In some implementations, the distance between the left and right fade points 128*a*-*b* and the left and right bounds 126*a*-*b* can be a percentage of the distance between the left bound 126*a* and the right bound 126*b*. For example, the position of the right fade point 128*b* can be automatically identified such that the duration between the right bound 126*b* and the right fade point 128*b* is 10% of the distance between the left and right bounds 126*a*-*b*. If the elapsed time between the left and right bounds 126*a*-*b* is 12 seconds, the right fade point 128*b* can be positioned so that it is 1.2 seconds to the right of the right bound 126*b* within the audio waveform 108. As another example, if the distance between the left and right bounds 126*a*-*b* is 100 pixels, the position of the left fade point 128*a* can be determined such that the left fade point 128*a* is 10 pixels to the left of the left bound 126*a*. In some implementations, the user can specify a percentage of the duration of the selected audio waveform portion 120 to be used as the duration for the fade portions. In some implementations, an ideal percentage can be automatically applied by an audio-video content management software application. In some implementations, the percentage is 10%.

In some implementations, a change in position of the right bound 126*b* or left bound 126*a* can cause a change in position of the right bound 126*b* and/or the left fade point 128*a*. For example, the user can select the right bound 126*b* and drag the right bound 126*b* to the right to expand the selection box 124 (and therefore include a greater amount of the audio waveform 108 within the selected audio waveform portion 120). The position of the right fade point 128*b* can be automatically adjusted in response to the changed location of the right bound 126*b*. For example, if the right fade point 128*b* is a set duration (e.g., 0.25 seconds) from the right bound 126*b*, the right fade point 128*b* can be moved a horizontal distance that corresponds to the change in position of the right bound 126*b*.

As another example, if the right fade point 128*b* is a percentage of the duration between the left and right bounds 126*a*-*b* from the right bound 126*b*, moving of the right bound 126*b* can cause the duration between the left and right bounds 126*a*-*b* to change. The new duration between the left and right bounds 126*a*-*b* can be identified, and the right fade point 128*b* can be moved so that it is a specified percentage (e.g., 10%) of the new duration from the right bound 126*b*. Continuing with this example, although the position of the left bound 126*a* has not been changed, the position of the left fade point 128*a* can be recalculated to reflect the new duration between the left and right bounds 126*a*-*b*. The left fade point 128*a* can be automatically repositioned so as to be a specified percentage of the new duration from the left bound 126*a*.

As a specific example, let the specified percentage for the duration of the left and right fade portions be 10%, the original duration between the left and right bounds 126*a*-*b* be 5 seconds, and the new duration between the left and right bounds 126*a*-*b* be 7 seconds. The original duration between the left fade point 128*a* and the left bound 126*a* is 0.5 seconds, and the original duration between the right bound 126*b* and the right fade point 128*b* is 0.5 seconds. The right bound 126*b* is moved (e.g., in response to user input) so that the new duration between the left and right bounds 126*a*-*b* is 7 seconds. The position of the right fade point 128*b* is automatically adjusted so that the duration between the new position of the right bound 126*b* and the right fade point 128*b* is 0.7 seconds. Furthermore, the left fade point 128*a* is automatically moved to the left so that the duration between the left fade point 128*a* and the left bound 126*a* is 0.7 seconds (i.e., 10% of the new duration between the left and right bounds 126*a*-*b*).

Figure 3B:
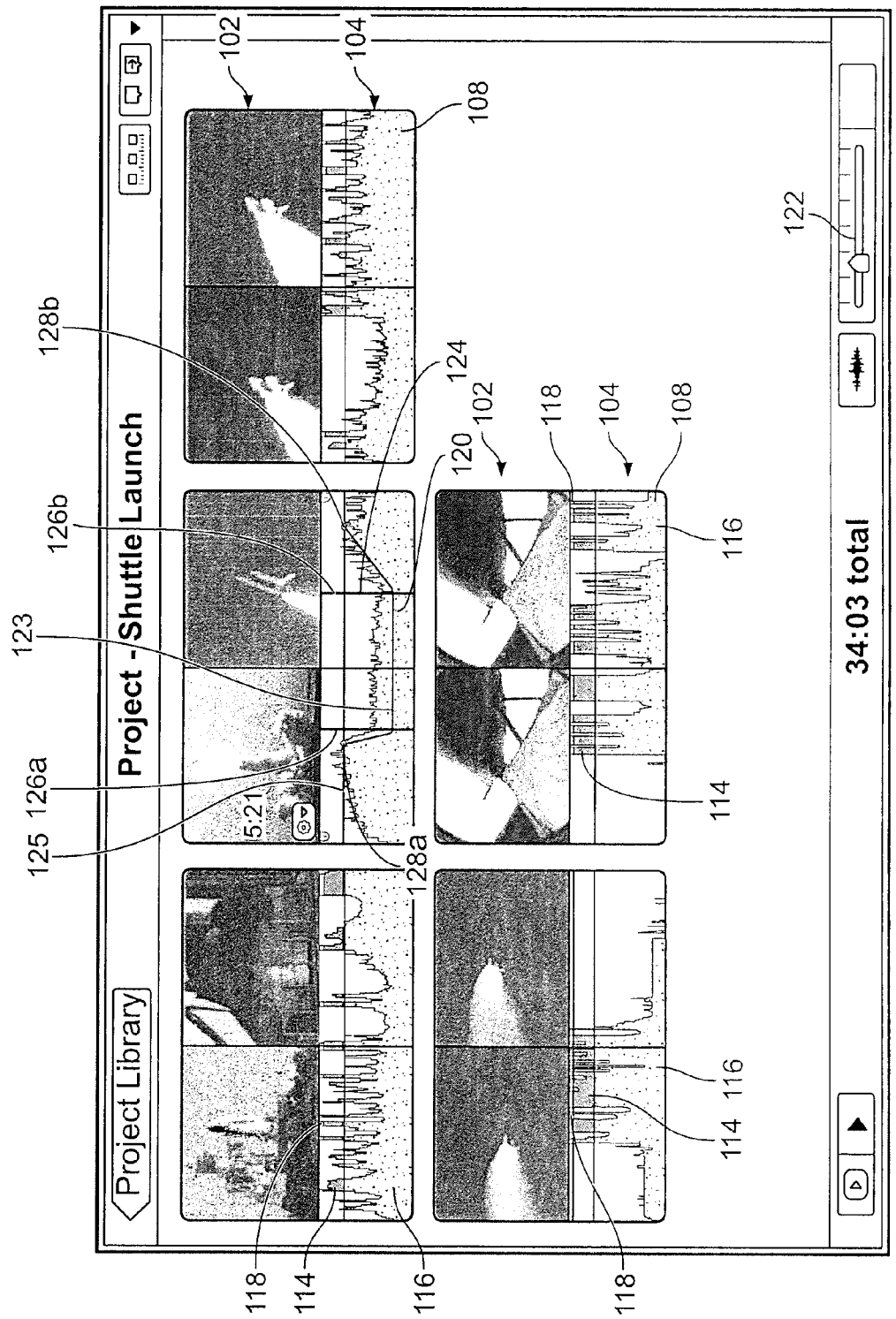

Referring now to FIG. 3B, in some implementations, the positions of the left and right fade points 128*a-b* can be manually adjusted based on user input. For example, the user can select the right fade point 128*b* and drag the position of the right fade point 128*b* to the right to expand the right fade portion. The amplitude of the audio waveform 108 within the right fade portion can be automatically adjusted as the right fade portion is expanded or contracted in response to the repositioning of the right fade point 128*b*.

In some implementations, rather than dragging the right fade point 128*b* to change the position of the right fade point 128*b*, the user can enter a different value for a set duration between the right bound 126*b* and the right fade point 128*b*, or enter a different value for a percentage of the duration of the selected audio waveform portion 120 at which the right fade point 128*b* should be positioned from the right bound 126*b*. For example, the user can change the percentage from 5% to 20% to cause the right fade point 128*b* to shift to the right so that the duration of the right fade portion is 20% of the duration of the selected audio waveform portion 120.

Figure 4:
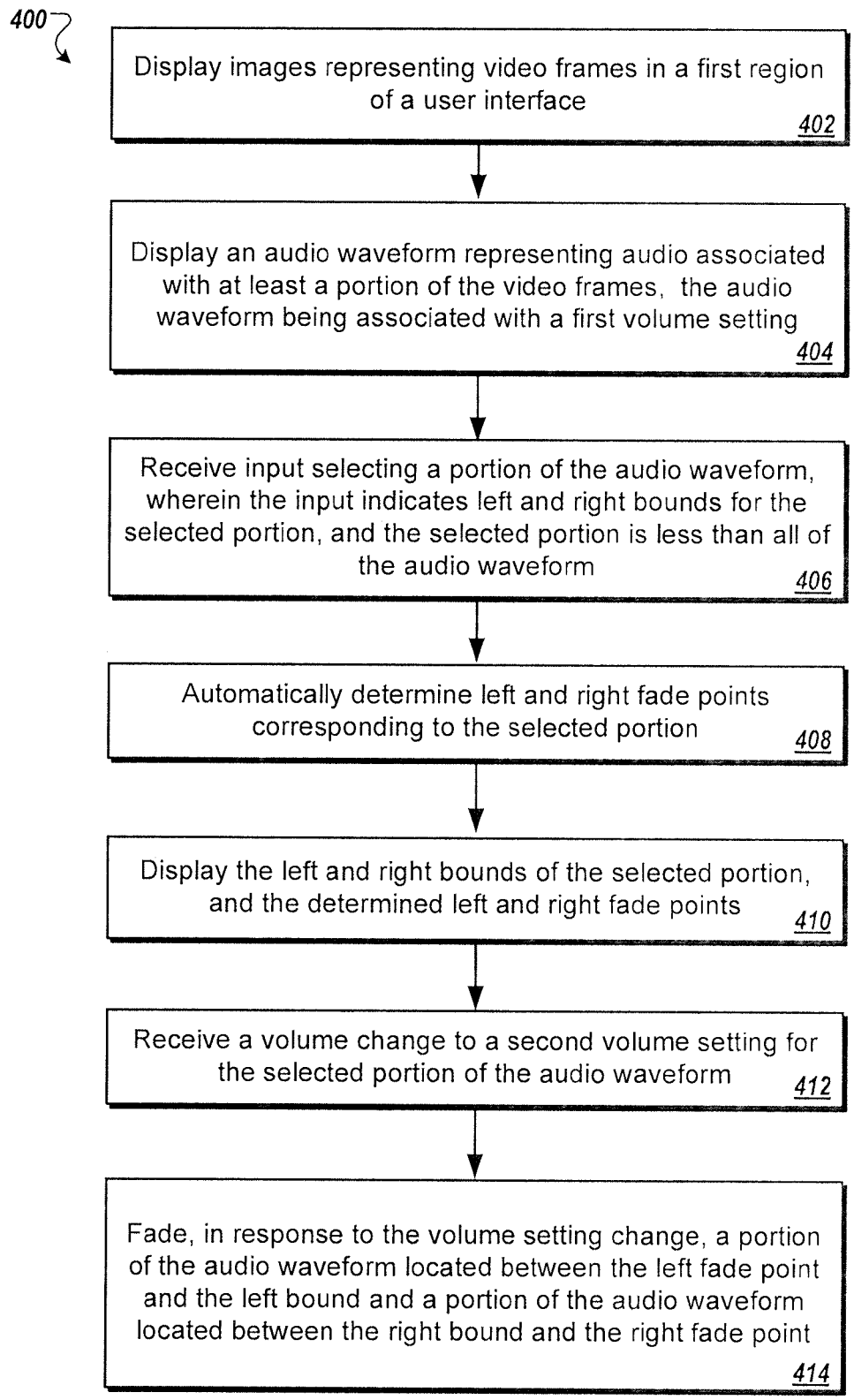
FIG. 4 is a flow diagram of an example process for automatically identifying fade points for a selected audio segment.

FIG. 4 is a process flow diagram showing an example process 400 for automatically identifying fade points for a selected audio segment. Images representing video frames are displayed in a first region of a user interface (402). For example, a computer system connected to a display screen can cause the display screen to display a user interface (e.g., the user interface 100 of FIG. 3A). The user interface can, for example, facilitate the editing of video sequences and audio sequences associated with the video sequences. In some implementations, the user interface can be presented by an audio-video content management software application. Images (e.g., images 106*a-j* of FIG. 1A) that represent a video sequence can be displayed in the user interface. In some implementations, the images can be still images taken from the video sequence. In some implementations, each image represents a segment of the video sequence. In some implementations, each image represents a number of video frames of the video sequence.

An audio waveform representing audio associated with at least a portion of the video frames is displayed. The audio waveform is associated with a first volume setting (404). For example, a waveform can be displayed that shows changes in volume level (amplitude) over time for the audio. The audio waveform can have an initial volume setting. The initial volume setting can be, for example, the volume setting at which the audio was originally recorded, a normalized volume setting, an automatically optimized volume setting, or a user defined volume setting. In some implementations, the initial volume setting can be set using a volume control, such as the volume control 122 of FIGS. 3A-3B.

In some implementations, segments of the waveform can be aligned with the images that represent video frames to indicate portions of audio that are played along with video segments represented by the images. In some implementations, the audio can be audio that is captured at the same time as the video. In some implementations, the audio can be added to the video after the video is captured. For example, the audio waveform can represent a song or a series of sound effects that are associated with the video after the video is captured.

An input selecting a portion of the audio waveform can be received. The input indicates left and right bounds for the selected portion, and the selected portion is less than all of the audio waveform (406). For example, referring to FIG. 3B, a user can use a cursor to select the audio waveform portion 120. The selected audio waveform portion 120 can be indicated by the selection box 124 having left and right bounds 126*a-b*. In some implementations, the user can make the selection using a single cursor motion. In some implementations, the user can indicate time points within the audio waveform in order to select a portion of the audio waveform. For example, the user can indicate a right bound of 12.2 seconds and a right bound of 14.7 seconds, from the beginning of the audio waveform, for a selected portion of the waveform. As another example, the user can indicate a left bound and a duration for the selected portion. For example, the user can indicate a left bound of 1 minute, 37 seconds from the beginning of the audio waveform and a duration of 13 seconds for the selected portion.

Left and right fade points corresponding to the selected portion are automatically determined (408). For example, a left fade point can be identified that is positioned to the left of the left bound, and a right fade point can be identified that is positioned to the right of the right bound. In some implementations, the left and right fade points are a set duration (or horizontal distance) from the left and right bounds. For example, the left fade point can be 1.0 seconds to the left of the left bound. In some implementations, the right fade point can be a different set distance from the right bound than the left fade point is from the left bound. In some implementations, the duration (or horizontal distance) between the left fade point and the left bound (or the right fade point and the right bound) can be a percentage of the duration (or horizontal distance) of the selected portion. For example, the distance between the left fade point and the left bound can be 10% of the distance between the left bound and the right bound. In some implementations, the positions of the left and right fade points are identified without explicit user input.

The left and right bounds of the selected portion, and the determined left and right fade points are displayed (410). For example, referring to FIG. 3A, the selected audio waveform portion 120 is visually indicated by the selection box 124. The left and right sides of the selection box 124 represent the left and right bounds 126*a-b* of the selected audio waveform portion 120. In some implementations, the selected audio waveform portion 120 can be visually indicated using shading, coloring, or highlighting. In addition to the left and right bounds 126*a-b* being visually indicated, the user interface 100 further includes visual representations of the left and right fade points 128*a-b*. In the example shown, the left and right fade points 128*a-b* are represented by circles. As another example, the left and right fade points can be represented by vertical lines, boxes, or other indicators.

A volume change to a second volume setting for the selected portion of the audio waveform is received (412). For example, the user can use a volume control (e.g., the volume control 122 of FIG. 3B) to indicate the second volume setting. As another example, the user can adjust a vertical orientation of a horizontal bar displayed within the selected portion to adjust the volume setting for the selected portion.

A portion of the audio waveform located between the left fade point and the left bound and a portion of the audio waveform located between the right bound and the right fade point are faded in response to the volume setting change (414). For example, the portion between the left fade point and the left bound (the left fade portion) can be faded from the initial volume setting to the second volume setting. If the second volume setting is less than the initial volume setting, the left fade portion fades down from left to right. If the second volume setting is greater than the initial volume setting, the left fade portion is faded up from left to right. In some implementations, a complimentary (mirror image) fade can be applied to the portion between the right bound and the right fade point (the right fade portion). In some implementations, a different fade can be applied to the right fade portion. The right fade portion can fade from the second volume setting to the initial volume setting from left to right.

In some implementations, the fade effects can take one of a number of forms. For example, the fade can be a linear fade effect. As another example, the fade can be a curved fade effect. In some implementations, the curve of a curved fade effect can follow the trajectory of a specified function. In some implementations, the fade effect can be a user defined fade effect. In some implementations, the user can select a default fade effect to be automatically be applied to the left and right fade portions. In some implementations, the left and right fade portions can include visual representations of the applied fades. For example, the amplitude of the waveform within the left fade portion can be adjusted to reflect the applied fade effect.

In some implementations, the process 400 can include more or fewer steps, or the steps can be performed in a different order. For example, the process 400 can include additional steps of receiving an indication of a change of position of the right bound, and automatically determining new positions for the left and right fade points.

Figure 5A:
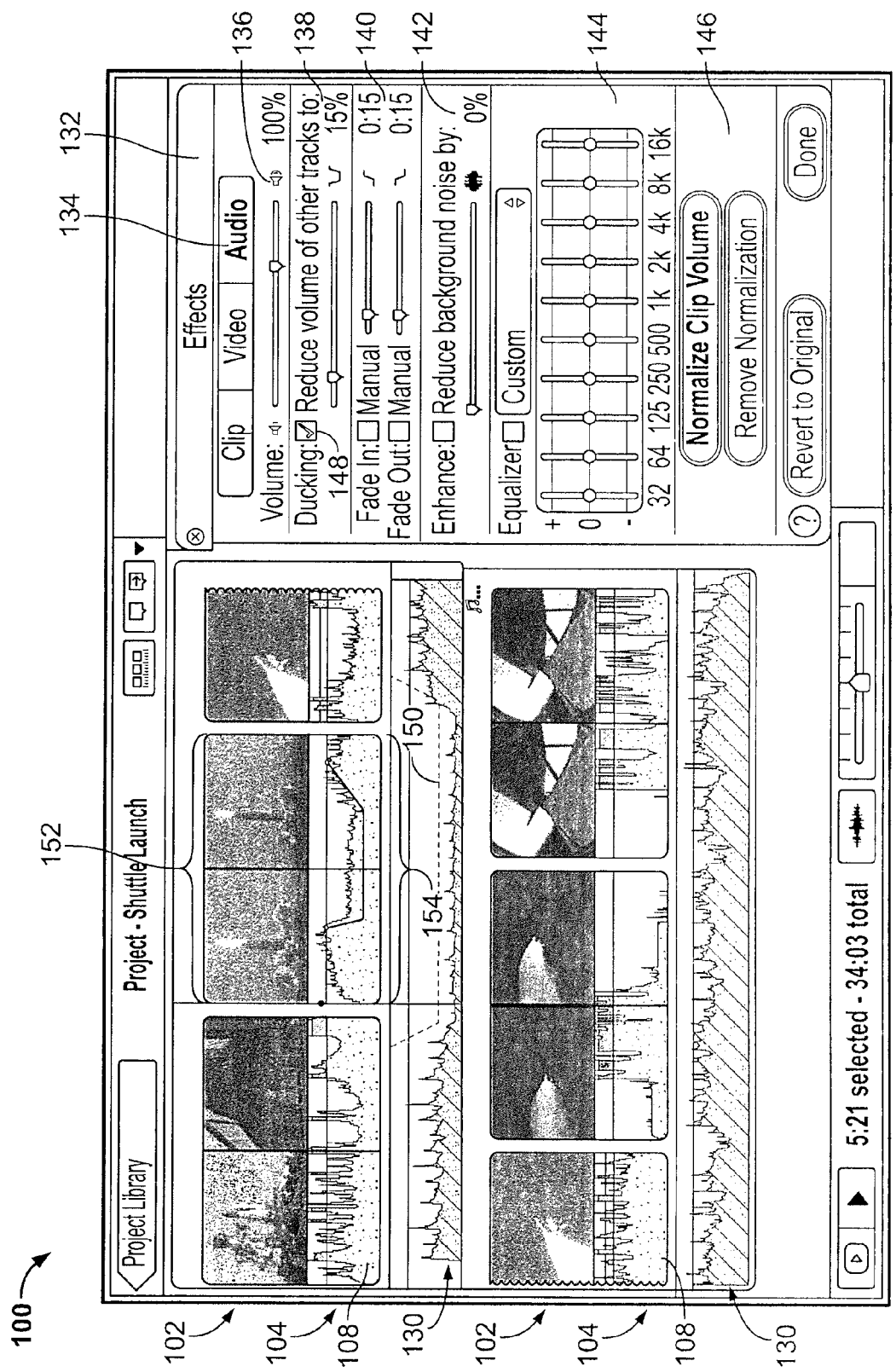
FIGS. 5A and 5B are examples of a user interface for applying and visualizing an audio effect associated with a video segment to various audio waveform segments.

Referring now to FIG. 5A, a second audio waveform 130 has been added to the user interface 100. In the example shown, the audio waveform 130 represents an audio sequence that has been associated with the video sequence 102 and the audio sequence 104. For example, the video sequence 102 can be footage of a shuttle launch and the audio sequence 104 can be audio that was recorded in conjunction with the capturing of the shuttle launch footage. The audio sequence associated with the audio waveform 130 can be background music (e.g., an .mp3, .wav, or .wma file) that has been associated with the video sequence 102 in order to enhance the video sequence 102. The audio sequence associated with the audio waveform 130 can be, for example, an orchestral arrangement that has been associated with the video sequence 102 to enhance the viewing experience for a user watching the video sequence 102.

In some implementations, segments of the audio waveform 130 can be associated with segments of the video sequence 102. In some such implementations, when the order of video segments of the video sequence 102 is changed, the order of associated segments of the audio waveform 130 will also change such that the associations between various video segments and audio waveform segments remains the same. In some implementations, the audio waveform 130 is associated with the video sequence 102 on a whole, however, individual segments of the audio waveform 130 are not specifically associated with individual segments of the video sequence 102. In some such implementations, when the order of video segments of the video sequence 102 is changed, the order of segments of the audio waveform 130 remains unchanged. For example, if the audio waveform 130 represents a musical track, it may be undesirable to change the order of segments of the audio waveform 130.

In some implementations, various portions of the audio waveform 130 can be color coded, shaded, or otherwise marked in order to visually differentiate portions of the audio waveform 130 that are within an ideal volume range from portions of the audio waveform 130 that are above or below the ideal volume range, as described above for the audio waveform 108 with respect to FIG. 1A.

In some implementations, one or more audio effects can be applied to the audio waveform 130. For example, the user interface 100 can include an effects menu 132. A user of the user interface 100 can select a control 134 in order to cause one or more potential audio effects to be displayed within the effects menu 132. The effects menu 132 can include a volume control 136. In some implementations, the volume control 136 can control the volume of all audio sequences associated with the video sequence 102. In some implementations, volume settings indicated using the volume control 136 are only applied to a selected audio waveform or selected audio waveform portion.

The effects menu 132 can further include a ducking control 138 for applying ducking effects to selected audio segments; a fade control 140 for controlling fade in and fade out of selected audio segments; a background noise reduction control 142 for reducing background noise in a selected audio segment; an equalizer control 144 for indicating audio settings for audio sequences or selected audio segments; and a normalization control 146 for controlling normalization of audio sequences or selected audio segments.

One or more of the controls displayed within the effects menu 132 can be applied to audio sequences or selected audio segments associated with the video sequence 102. For example, the user can select a check box 148 associated with the ducking control 138 in order to apply a ducking effect to an indicated audio segment. A ducking effect can be a reduction in volume to one or more audio sequences. In some implementations, a ducking effect is applied to all audio sequences except for an audio sequence designated as a primary audio sequence. For example, the audio sequence 104 can be designated as a primary audio sequence, either by a user, or automatically (e.g., because it was recorded at the same time that the video sequence 102 was captured)

In this example, a ducking effect 150 can be applied to the audio sequence associated with the audio waveform 130 since the audio sequence is not designated as a primary audio sequence. For example, the ducking effect may be applied to the audio waveform 130 since the audio sequence 104 includes an important piece of dialogue while during the segment in which the ducking effect is applied. The ducking effect is applied in order to reduce the volume of the audio sequence associated with the audio waveform 130 to allow a user listening to the audio sequence 104 to more readily hear the dialogue during this portion. In the example shown, a visual representation of the ducking effect 150 is displayed within the audio waveform 130. In this example, the reduction in volume is visually represented by a dotted line. Additionally, the amplitude of the audio waveform 130 is reduced over the portion of the audio waveform 130 to which the ducking effect 150 is applied in order to indicate that the volume setting of the indicated portion has been reduced from an initial volume setting.

In some implementations, although the ducking effect 150 (or another audio effect) is applied to the audio sequence associated with the audio waveform 130, the positioning of the ducking effect (or other audio effect) can be associated with a video segment 152. The video segment 152 is in turn associated with an audio segment 154). In such implementations, the ducking effect can be applied to an audio segment (of the audio waveform 130) that occurs at the same time as the video segment 152 when the video sequence 102 is played.

Figure 5B:
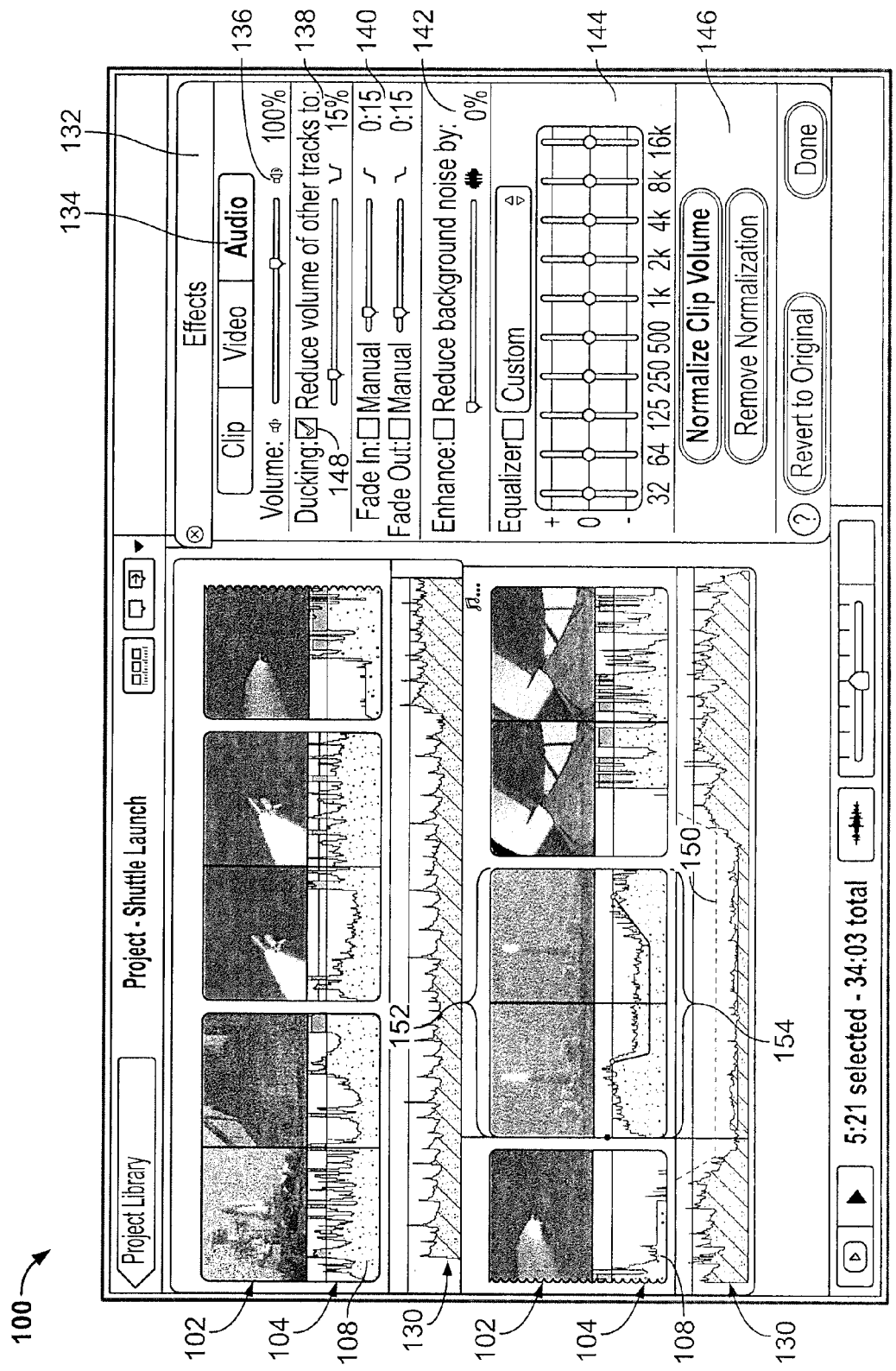

Referring to FIG. 5B, the position of the video segment 152 within the video sequence 102 has been changed. For example, a user can select the video segment 152 and drag the video segment 152 from the position shown in FIG. 5A to the position shown in FIG. 5B. This changes the position, in time, at which the video segment 152 will be played within the video sequence 102. In the example shown, the position of the audio segment 154 that is associated with the video segment 152 is also changed so that the audio segment 154 of the audio sequence 104 remains aligned with the video segment 152. However, segments of the audio waveform 130 have not changed position. Therefore, the video segment 152 is now aligned with a different portion of the audio waveform 130 than in the arrangement shown in FIG. 5A.

In this example, the position of the ducking effect 150 is associated with the video segment 152. Therefore, the ducking effect 150 is now applied to the portion of the audio waveform 130 that is aligned with the video segment 152 in FIG. 5B. Additionally, in some implementations, the ducking effect 150 is removed from the portion of the audio waveform 130 that had been aligned with the video segment 152 prior to the repositioning of the video segment 152 (e.g., the portion of the audio waveform 130 to which the ducking effect 150 is applied in FIG. 5A).

An exemplary situation in which it can be useful to associate an audio effect with a video segment, rather than an audio segment to which it is applied, is now given. The audio segment 154 that is associated with the video segment 152 can include important dialog. The ducking effect 150 is associated with the video segment 152 so that the volume level of the background music (i.e., the audio sequence associated with the audio waveform 130) is lowered when the audio segment 154 is played. When the video segment 152 is repositioned within the video sequence 102, the audio segment 154 is also repositioned so that the audio segment 154 is still aligned with the video segment 152. In this situation, the position of the ducking effect 150 is also changed such that the ducking effect 150 remains aligned with the video segment 152 and the audio segment 154. This causes the section of background music that is aligned with the video segment 152 and audio segment 154 after the repositioning to be lowered when the audio segment 154 is played. Additionally, after the video segment 152 is repositioned, the ducking effect is no longer applied to the section of the background music that had been aligned with the video segment 152 prior to the repositioning.

Although associating audio effects with a video segment is described above with reference to a ducking effect, the same methods can be applied to other types of audio effects. For example, an echo effect can be associated with the video segment 152, and applied to a portion of the audio waveform 130 that aligns with the video segment 152. As another example, specific equalizer settings can be associated with a portion of a video sequence and applied to a portion of an audio sequence that is aligned with the portion of the video sequence. If the portion of the video sequence is repositioned, the equalizer settings can be applied to a portion of the audio sequence that is aligned with the portion of the video sequence after the repositioning. As yet another example, a pitch correction effect can be associated with a video segment and applied to a segment of secondary audio track that is associated with the video segment.

Figure 6:
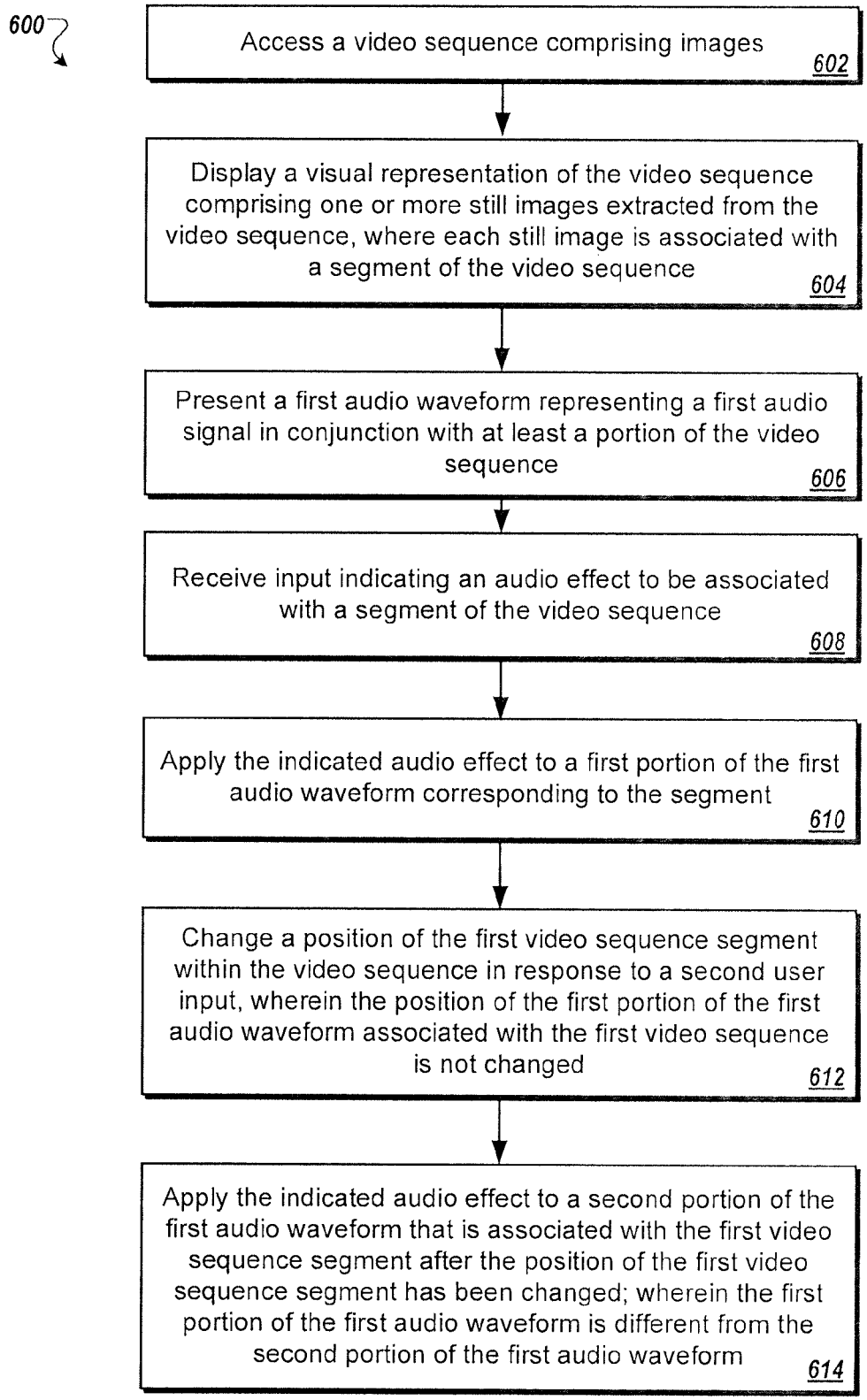
FIG. 6 is a flow diagram of an example process for applying an audio effect associated with a video segment to various audio waveform segments.

FIG. 6 is a process flow diagram showing an example process 600 for applying an audio effect associated with a video segment to various audio waveform segments. A video sequence comprising images is accessed (602). The video sequence can be, for example, a sequence of images (i.e., frames) that are played in succession. The video sequence can be captured using a video camera, a digital video recorder, or other device. In some implementations, the video sequence can include multiple sub-sequences that were recorded at different times. The video sequence can be stored as a video file in a hard drive or other memory of a computing device. The video sequence can be accessed, for example, by an audio-video content management software application running on one or more computing devices.

A visual representation of the video sequence comprising one or more still images extracted from the video sequence is displayed, where each still image is associated with a segment of the video sequence (604). For example, a computer system connected to a display screen can cause the display screen to display a user interface (e.g., the user interface 100 of FIG. 5A). The user interface can, for example, facilitate the editing of video sequences and audio sequences associated with the video sequences. Images (e.g., images 106a-j of FIG. 1A) that represent a video sequence can be displayed in the user interface. The displayed images can be still images taken from the video sequence. In some implementations, each displayed image represents a segment of the video sequence. In some implementations, each displayed image represents a number of video frames of the video sequence. In some implementations, each displayed image is taken from one of the video frames represented by the image.

A first audio waveform representing a first audio signal in conjunction with at least a portion of the video sequence is presented (606). For example, a wave form can be displayed that shows changes in volume level (amplitude) over time for the audio. In some implementations, segments of the wave form can be aligned with the images that represent video frames to indicate portions of audio that are played along with video segments represented by the images. In some implementations, the audio can be audio that is captured at the same time as the video. In some implementations, the audio can be added to the video after the video is captured. For example, the audio wave form can represent background music or a series of sound effects that are associated with the video after the video is captured.

Input indicating an audio effect to be associated with a segment of the video sequence is received (608). For example, a user of a user interface can select a video segment of the vide sequence. The user can then use an effect control (e.g., the effects menu 132 of FIG. 5A), to select one or more audio effects or settings to associate with the video sequence. For example, the user can select a ducking effect and set a ducking percentage in accordance with the ducking effect. As another example, the user can select a static effect and select an intensity level for the static effect.

The indicated audio effect is applied to a first portion of the first audio waveform corresponding to the segment (610). For example, the indicated audio effect can be applied to a portion of the audio waveform that is aligned with the video segment, such that the portion of the audio waveform and the video segment are played at the same time during play back of the video segment. As another example, referring to FIG. 5A, the ducking effect 150 is associated with the video segment 152 and is applied to a portion of the audio waveform 130 that is aligned with the video segment 152. The amplitude of the audio waveform portion is reduced as indicated by the user using the effects menu 132. As another example, a background noise reduction effect indicated by the user and associated with the video segment can be applied to an audio segment that is aligned with the video segment.

A position of the first video sequence segment within the video sequence is changed in response to a second user input, wherein the position of the first portion of the first audio waveform associated with the first video sequence is not changed (612). For example, referring to FIGS. 5A and 5B, the position of the video segment 152 is changed within the video sequence 102 from a position shown in FIG. 5A, to a different position shown in FIG. 5B. The positions of portions of the audio waveform 130 remains unchanged from FIG. 5A to 5B. For example, the audio waveform 130 can represent a song, and changing positions of portions of the audio waveform 130 would lead to portions of the song being played out of order (and therefore to a less than enjoyable listener experience). Therefore, the positions of the portions of the audio waveform 130 remain unchanged when the position of the video segment 152. After the change of position, the video segment 152 is now aligned with a different portion of the audio waveform 130 than prior to the change of position.

In some implementations, a user can indicate a change of position for the video segment using a cursor by selecting the video segment, and dragging the video segment to a new position within the video sequence. In some implementations, the user can indicate the video segment and indicate a time mark at which the video segment should be positioned within the video sequence.

The indicated audio effect is applied to a second portion of the first audio waveform that is associated with the first video sequence segment after the position of the first video sequence segment has been changed, wherein the first portion of the first audio waveform is different from the second portion of the first audio waveform (614). For example, after the position of the video segment is changed, an echo effect associated with the video segment can be applied to a portion of the first audio waveform that is aligned with the video segment after the change of position. As another example, referring to FIG. 5B, the ducking effect 150 is applied to the portion of the audio waveform 130 that is aligned with the video segment 152 after the change of position of the video segment 152 within the video sequence 102.

In some implementations, the process 600 can include more or less steps, or the steps can be performed in a different order. For example, the process 600 can include an additional step of removing the indicated audio effect from the first portion of the first audio waveform responsive to the changing of position of the first video sequence segment. For example, referring to FIGS. 5A and 5B, after the position of the video segment 152 is changed (FIG. 5B), the ducking effect 150 is no longer applied to the portion of the audio waveform 130 that had been aligned with the video segment 152 prior to the change of position (FIG. 5A).

Figure 7:
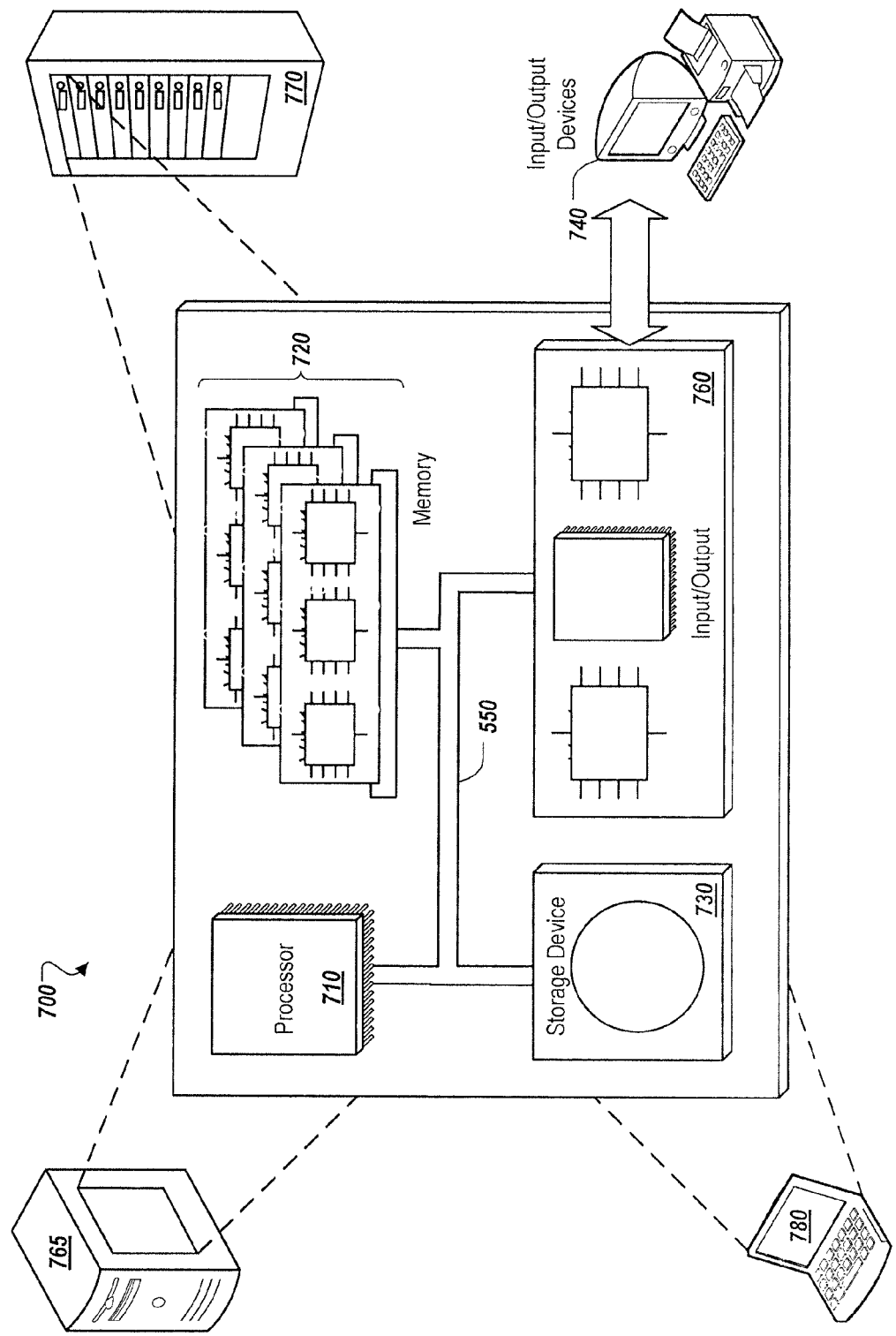
FIG. 7 is a block diagram of a computing device and system that can be used in connection with computer-implemented methods and systems described in this document.

FIG. 7 is a block diagram of a computing device and system that can be used, e.g., to provide a user interface for manipulating audio waveforms associated with video content. Computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 700 includes a processor 710, memory 720, a storage device 730, a high-speed interface 750 connecting to memory 720. The computing device can also include high-speed expansion ports (not shown), and a low speed interface (not shown) connecting to low speed bus (not shown) and storage device 730. Each of the components 710, 720, 730, 750, and 720, are interconnected using various busses, and can be mounted on a common motherboard or in other manners as appropriate. The processor 710 can process instructions for execution within the computing device 700, including instructions stored in the memory 720 or on the storage device 730 to display graphical information for a GUI on an external input/output device, such as display 740 coupled to an input/output interface 760. In other implementations, multiple processors and/or multiple buses can be used, as appropriate, along with multiple memories and types of memory. Also, multiple computing devices 700 can be connected, with each device providing portions of the necessary operations (e.g., as a server bank, a group of blade servers, or a multi-processor system).

The memory 720 stores information within the computing device 700. In one implementation, the memory 720 is a computer-readable medium. In one implementation, the memory 720 is a volatile memory unit or units. In another implementation, the memory 720 is a non-volatile memory unit or units.

The storage device 730 is capable of providing mass storage for the computing device 700. In one implementation, the storage device 730 is a computer-readable medium. In various different implementations, the storage device 730 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The computer- or machine-readable medium can include the memory 720, the storage device 730, or memory on processor 710.

The high speed controller 750 manages bandwidth-intensive operations for the computing device 700, while the low speed controller manages lower bandwidth-intensive operations. Such allocation of duties is exemplary only. In one implementation, the high-speed controller 750 is coupled to memory 720, display 740 (e.g., through a graphics processor or accelerator), and to high-speed expansion ports (not shown), which can accept various expansion cards (not shown). In the implementation, low-speed controller (not shown) is coupled to storage device 730 and low-speed expansion port (not shown). The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 765, or multiple times in a group of such servers. It can also be implemented as part of a rack server system 770. In addition, it can be implemented in a personal computer such as a laptop computer 780.

[this paragraph starts the boiler plate language and thus you need not read these paragraphs carefully. However, you should review the claims.] Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer or machine readable medium for execution by, or to control the operation of, data processing apparatus. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application. A number of embodiments have been described. Nevertheless, it will be understood that various modifications are optionally made without departing from the spirit and scope of this disclosure. Accordingly, other embodiments are within the scope of the following claims.

What is claimed is:

1. A method performed by one or more processes executing on a computer system, the method comprising:
    displaying images representing video frames in a first region of a user interface;
    displaying an audio waveform representing audio associated with at least a portion of a video frame; and
    graphically distinguishing at least three audio waveform portions including (i) a first portion of the audio waveform that exceeds a first predetermined threshold, (ii) a second portion of the audio waveform below the first predetermined threshold and above a second predetermined threshold, and (iii) a third portion of the audio waveform below the second predetermined threshold;

wherein an audio volume range defined by the first predetermined threshold and the second predetermined threshold is a preferred audio volume range.

2. The method of claim 1, wherein the first predetermined threshold is substantially 0 decibels and the second predetermined threshold is substantially −6 decibels.

3. The method of claim 1, wherein graphically distinguishing further comprises:
representing the first portion of the audio waveform in a first color, the second portion of the audio waveform in a second, different, color, and the third portion of the audio waveform in a third, different, color.

4. The method of claim 3, further comprising:
receiving a user input indicating a change in volume level for at least a portion of the audio waveform; and
changing an appearance of the audio waveform in response to the received user input;
wherein changing the appearance of the audio waveform includes positioning a segment of the audio waveform between the first predetermined threshold and the second predetermined threshold and applying the second color to the segment, wherein the segment had not previously been positioned between the first and second predetermined thresholds.

5. A method performed by one or more processes executing on a computer system, the method comprising:
displaying images representing video frames in a first region of a user interface;
displaying an audio waveform representing audio associated with at least a portion of the video frames, the audio waveform being associated with a first volume setting;
receiving input selecting a portion of the audio waveform, wherein the input indicates left and right bounds for the selected portion, and the selected portion is less than all of the audio waveform;
automatically determining left and right fade points corresponding to the selected portion;
displaying, in conjunction with the audio waveform, the left and right bounds of the selected portion, and the determined left and right fade points;
receiving a volume change to a second volume setting for the selected portion of the audio waveform;
fading, in response to the volume setting change, a portion of the audio waveform located between the left fade point and the left bound from the first volume setting to the second volume setting; and
fading, in response to the volume setting change, a portion of the audio waveform located between the right bound and the right fade point from the second volume setting to the first volume setting.

6. The method of claim 5, wherein the duration between a fade point and the corresponding bound is a predetermined percentage of the duration between the left bound and the right bound.

7. The method of claim 6, wherein the predetermined percentage is 10 percent.

8. The method of claim 6, further comprising:
receiving input indicating a change in position of the right bound; and
changing the position of the right bound, the left fade point, and the right fade point in response to the received input, so that the duration between the left fade point and the left bound is the predetermined percentage of the duration between the left bound and the new position for the right bound and the duration between the right fade point and the right bound is the predetermined percentage of the duration between the left bound and the new position for the right bound.

9. The method of claim 5, further comprising:
receiving input indicating a change in position of the right bound; and
changing the position of the right bound and the right fade point in response to the received input.

10. The method of claim 5, wherein the left fade point is a set duration from the left bound and the right fade point is a set duration from the right bound.

11. The method of claim 5, wherein fading comprises applying a linear fade.

12. The method of claim 5, wherein fading comprises applying a user selected fade.

13. The method of claim 5, further comprising:
displaying a visual representation of the fading for at least one of the portion of the audio waveform located between the left fade point and the left bound, and the portion of the audio waveform located between the right bound and the right fade point.

14. The method of claim 5, wherein the received input is entered using a single cursor motion.

15. A method performed by one or more processes executing on a computer system, the method comprising:
accessing a video sequence comprising images;
displaying a visual representation of the video sequence comprising one or more still images extracted from the video sequence, where each still image is associated with a segment of the video sequence;
presenting a first audio waveform representing a first audio signal in conjunction with at least a portion of the video sequence;
receiving input indicating an audio effect to be associated with a segment of the video sequence;
applying the indicated audio effect to a first portion of the first audio waveform corresponding to the segment;
changing a position of the first video sequence segment within the video sequence in response to a second user input, wherein the position of the first portion of the first audio waveform associated with the first video sequence is not changed; and
applying the indicated audio effect to a second portion of the first audio waveform that is associated with the first video sequence segment after the position of the first video sequence segment has been changed; wherein the first portion of the first audio waveform is different from the second portion of the first audio waveform.

16. The method of claim 15, wherein the indicated audio effect is removed from the first portion of the first audio waveform responsive to the changing of position of the first video sequence segment.

17. The method of claim 15, further comprising:
presenting a second audio waveform representing a second audio signal associated with the video sequence, wherein a first portion of the second audio waveform is associated with the first video sequence segment; and
changing a position of the first portion of the second audio waveform responsive to the changing of position of the first video sequence segment such that the first portion of the second audio waveform is aligned with the first video sequence segment after the position of the first video sequence segment has been changed.

18. The method of claim 17, further comprising:
applying the indicated audio effect to the first portion of the second audio waveform.

19. The method of claim 15, wherein the indicated audio effect is a ducking effect and a visual representation of the ducking effect is applied to the second portion of the first audio waveform.

20. A system configured to facilitate the graphic distinguishing of portions of an audio waveform, the system comprising:
a display device configured to display images representing video frames in a first region of a user interface and an audio waveform representing audio associated with at least a portion of a video frame; and
a computer system executing one or more processes to perform operations comprising:
determining that a first portion of the audio waveform exceeds a first predetermined threshold;
determining that a second portion of the audio waveform is positioned below the first predetermined threshold and above a second predetermined threshold;
determining that a third portion of the audio waveform is positioned below the second predetermined threshold; and
graphically distinguishing the first, second, and third portions of the audio waveform;
wherein an audio volume range defined by the first predetermined threshold and the second predetermined threshold is a preferred audio volume range.

21. The system of claim 20, wherein graphically distinguishing includes representing the first portion of the audio waveform in a first color, the second portion of the audio waveform in a second, different, color, and the third portion of the audio waveform in a third, different, color.

22. The system of claim 21, further comprising:
an input device for receiving a user input indicating a change in volume level for at least a portion of the audio waveform;
wherein the computer system is configured to change an appearance of the audio waveform in response to the received user input; and
wherein changing the appearance of the audio waveform includes positioning a segment of the audio waveform between the first predetermined threshold and the second predetermined threshold and applying the second color to the segment, wherein the segment had not previously been positioned between the first and second predetermined thresholds.

23. A computer storage medium encoded with a computer program, the program comprising instructions that when executed by data processing apparatus cause the data processing apparatus to perform operations comprising:
displaying images representing video frames in a first region of a user interface;
displaying an audio waveform representing audio associated with at least a portion of a video frame; and
graphically distinguishing at least three audio waveform portions including (i) a first portion of the audio waveform that exceeds a first predetermined threshold, (ii) a second portion of the audio waveform below the first predetermined threshold and above a second predetermined threshold, and (iii) a third portion of the audio waveform below the second predetermined threshold;
wherein an audio volume range defined by the first predetermined threshold and the second predetermined threshold is a preferred audio volume range.

24. The computer storage medium of claim 23, wherein the first predetermined threshold is substantially 0 decibels and the second predetermined threshold is substantially −6 decibels.

25. A system configured to facilitate the automatic identification and display of fade points for an audio waveform, the system comprising:
a display device configured to display images representing video frames in a first region of a user interface and an audio waveform representing audio associated with at least a portion of the video frames, the audio waveform being associated with a first volume setting;
a first input device for user input indicating a selection of a portion of the audio waveform, wherein the input indicates left and right bounds for the selected portion, and the selected portion is less than all of the audio waveform;
a fade point determination module configured to automatically determine left and right fade points corresponding to the selected portion;
a second input device for receiving user input indicating a volume change to a second volume setting for the selected portion of the audio waveform; and
a fading module configured to fade a portion of the audio waveform located between the left fade point and the left bound from the first volume setting to the second volume setting in response to the volume setting change, and fade a portion of the audio waveform located between the right bound and the right fade point from the second volume setting to the first volume setting in response to the volume setting change;
wherein the display device is further configured to display, in conjunction with the audio waveform, the left and right bounds of the selected portion, and the left and right fade points.

26. The system of claim 25, wherein the duration between a fade point and the corresponding bound is a predetermined percentage of the duration between the left bound and the right bound.

27. The system of claim 26, wherein the predetermined percentage is 10 percent.

28. The system of claim 25, wherein the display device is further configured to display a visual representation of the fading for at least one of the portion of the audio waveform located between the left fade point and the left bound, and the portion of the audio waveform located between the right bound and the right fade point.

29. A computer storage medium encoded with a computer program, the program comprising instructions that when executed by data processing apparatus cause the data processing apparatus to perform operations comprising:
displaying images representing video frames in a first region of a user interface;
displaying an audio waveform representing audio associated with at least a portion of the video frames, the audio waveform being associated with a first volume setting;
receiving input selecting a portion of the audio waveform, wherein the input indicates left and right bounds for the selected portion, and the selected portion is less than all of the audio waveform;
automatically determining left and right fade points corresponding to the selected portion;
displaying, in conjunction with the audio waveform, the left and right bounds of the selected portion, and the determined left and right fade points;
receiving a volume change to a second volume setting for the selected portion of the audio waveform;
fading, in response to the volume setting change, a portion of the audio waveform located between the left fade point and the left bound from the first volume setting to the second volume setting; and fading, in response to the volume setting change, a portion of the audio waveform located between the right bound and the right fade point from the second volume setting to the first volume setting.

30. The medium of claim 29, wherein the program further comprises instructions that when executed by data processing apparatus cause the data processing apparatus to perform operations comprising:
  receiving input indicating a change in position of the right bound; and
  changing the position of the right bound and the right fade point in response to the received input.

31. A system configured to facilitate the application of audio effects to audio waveforms, the system comprising:
  a display device configured to display a visual representation of a video sequence comprising one or more still images extracted from the video sequence, where each still image is associated with a segment of the video sequence; and further configured to display a first audio waveform representing a first audio signal in conjunction with at least a portion of the video sequence;
  a first input device for receiving a user input indicating an audio effect to be associated with a segment of the video sequence;
  an audio effect application module configured to apply the indicated audio effect to a first portion of the first audio waveform corresponding to the segment;
  a second input device for receiving a second user input indicating a change of position of the first video sequence segment within the video sequence;
  a computer system executing one or more processes to perform operations comprising:
    changing a position of the first video sequence segment within the video sequence in response to the second user input, wherein the position of the first portion of the first audio waveform associated with the first video sequence is not changed; and
    applying the indicated audio effect to a second portion of the first audio waveform that is associated with the first video sequence segment after the position of the first video sequence segment has been changed; wherein the first portion of the first audio waveform is different from the second portion of the first audio waveform.

32. The system of claim 31, wherein the indicated audio effect is removed from the first portion of the first audio waveform responsive to the changing of position of the first video sequence segment.

33. The system of claim 31, wherein the indicated audio effect is a ducking effect and a visual representation of the ducking effect is applied to the second portion of the first audio waveform.

34. A computer storage medium encoded with a computer program, the program comprising instructions that when executed by data processing apparatus cause the data processing apparatus to perform operations comprising:
  accessing a video sequence comprising images;
  displaying a visual representation of the video sequence comprising one or more still images extracted from the video sequence, where each still image is associated with a segment of the video sequence;
  presenting a first audio waveform representing a first audio signal in conjunction with at least a portion of the video sequence;
  receiving input indicating an audio effect to be associated with a segment of the video sequence;
  applying the indicated audio effect to a first portion of the first audio waveform corresponding to the segment;
  changing a position of the first video sequence segment within the video sequence in response to a second user input, wherein the position of the first portion of the first audio waveform associated with the first video sequence is not changed; and
  applying the indicated audio effect to a second portion of the first audio waveform that is associated with the first video sequence segment after the position of the first video sequence segment has been changed; wherein the first portion of the first audio waveform is different from the second portion of the first audio waveform.

35. The medium of claim 34, wherein the indicated audio effect is removed from the first portion of the first audio waveform responsive to the changing of position of the first video sequence segment.

36. The medium of claim 34, wherein the program further comprises instructions that when executed by data processing apparatus cause the data processing apparatus to perform operations comprising:
  presenting a second audio waveform representing a second audio signal associated with the video sequence, wherein a first portion of the second audio waveform is associated with the first video sequence segment; and
  changing a position of the first portion of the second audio waveform responsive to the changing of position of the first video sequence segment such that the first portion of the second audio waveform is aligned with the first video sequence segment after the position of the first video sequence segment has been changed.

* * * * *